United States Patent
Baker et al.

(10) Patent No.: US 8,930,768 B2
(45) Date of Patent: Jan. 6, 2015

(54) SYSTEM AND METHOD OF FAILOVER FOR AN INITIATED SIP SESSION

(71) Applicant: Avaya Inc., Basking Ridge, NJ (US)

(72) Inventors: Stephen Andrew Baker, Arvada, CO (US); Harsh V. Mendiratta, East Brunswick, NJ (US); Kevin Sean Cripps, Boulder, CO (US); Ryan Scott Wallach, Westminster, CO (US)

(73) Assignee: Avaya Inc., Basking Ridge, NJ (US)

( * ) Notice: Subject to any disclaimer, the term of this patent is extended or adjusted under 35 U.S.C. 154(b) by 224 days.

(21) Appl. No.: 13/630,773

(22) Filed: Sep. 28, 2012

(65) Prior Publication Data

US 2014/0095922 A1    Apr. 3, 2014

(51) Int. Cl.
*G06F 11/00* (2006.01)

(52) U.S. Cl.
USPC ........ 714/38.12; 714/4.1; 714/4.11; 714/47.1

(58) Field of Classification Search
CPC ... G06F 11/14; G06F 11/142; G06F 11/1423; G06F 11/1443; G06F 11/20; G06F 11/2002; G06F 11/2005; G06F 11/202; G06F 11/2023; G06F 11/3006
USPC ............... 714/4.1, 4.11, 4.12, 4.2, 4.21, 38.1, 714/47.1
See application file for complete search history.

(56) References Cited

U.S. PATENT DOCUMENTS

| | | | |
|---|---|---|---|
| 7,661,027 B2 | 2/2010 | Langen et al. | |
| 2007/0195732 A1* | 8/2007 | Akram et al. | 370/331 |
| 2007/0220302 A1* | 9/2007 | Cline et al. | 714/4 |
| 2008/0137531 A1* | 6/2008 | Tal-Aviv et al. | 370/221 |
| 2008/0155310 A1* | 6/2008 | Langen et al. | 714/6 |
| 2009/0245098 A1* | 10/2009 | Baker et al. | 370/221 |
| 2010/0124163 A1 | 5/2010 | Qiu et al. | |
| 2011/0122863 A1 | 5/2011 | Balasaygun et al. | |
| 2012/0042199 A1* | 2/2012 | Chavez et al. | 714/4.21 |
| 2013/0097330 A1* | 4/2013 | Qiu et al. | 709/228 |

OTHER PUBLICATIONS

SIP Session Affinity and Failover. http://publib.boulder.ibm.com/infocenter/wasinfo/v7r0/index.jsp?topic=%2Fcom.ibm.websphere.nd.multiplatform.doc%2Finfo%2Fae%2Fae%2Fcsip_sessionfail.html. Last updated Oct. 22, 2012. 4 pages.
Deruelle, J. et al. JBoss Communications Platform 5.1. SIP Load Balancer User Guide. Ed. 5.1.0. http://docs.redhat.com/docs/en-US/JBoss_Communications_Platform/5.1/pdf/SIP_Load_Balancer_User_Guide/JBoss_Communications_Platform-5.1-SIP_Load_Balancer_User_Guide-en-US.pdf. Retrieved from the Internet on Dec. 11, 2012. 4 pages. 25 pages.

* cited by examiner

*Primary Examiner* — Joseph D Manoskey
(74) *Attorney, Agent, or Firm* — Sheridan Ross P.C.

(57) ABSTRACT

An initial SIP message is sent to establish a first SIP communication session from a first SIP device. The initial SIP message is sent via a first of a plurality of session managers to a second SIP device. After receiving the initial SIP message at the second SIP device and before ending the first SIP communication session, either the first or second SIP device sends a second SIP message. The second SIP message is sent to the first of the plurality of session managers. Either the first or second SIP devices detects that a response SIP message to the sent second SIP message was not received within a defined time period. In response to detecting that the SIP response message was not received within the defined time period, either the first or second SIP device resends the second SIP message to a second one of the plurality of session managers.

20 Claims, 8 Drawing Sheets

| 106A |
|---|
| Failover Group Domain Name600 |
| Preferred SM1 |
| Alternate 1 SM2 |
| Alternate 2 SM3 |

| 106B |
|---|
| Failover Group Domain Name 602 |
| Preferred SM2 |
| Alternate 1 SM1 |
| Alternate 2 SM3 |

| 106C |
|---|
| Failover Group Domain Name 604 |
| Preferred SM3 |
| Alternate 1 SM1 |
| Alternate 2 SM3 |

SYSTEM AND METHOD OF FAILOVER FOR AN INITIATED SIP SESSION

TECHNICAL FIELD

The system and method relates to fail over systems and in particular to failover systems for the Session Initiation Protocol (SIP).

BACKGROUND

There are systems that can detect a failure of a communication system. In the event that one of the communication systems fails, another communication system can take over for the failed communication system. Some systems can mirror every communication that is sent and then resume existing communications based on detecting a failure. However, where the failover communication system is distributed to provide a more robust solution, mirroring does not work effectively due to delays in a network.

The Session Initiation Protocol (SIP) usually works in a distributed environment. Existing SIP solutions can detect a failover and redirect new SIP sessions to the failover communication system. However, if an existing SIP session has already been established, with existing solutions, the existing SIP session will time out and fail. Failing an existing SIP session is not an ideal solution. What is needed is a way to provide solutions that will failover an established SIP session.

SUMMARY

Systems and methods are provided to solve these and other problems and disadvantages of the prior art. An initial Session Initiation Protocol (SIP) message is sent to establish a first SIP communication session from a first SIP device to a second SIP device. A SIP communication session can be, for example, a SIP dialog referred to in many of the SIP RFCs. Likewise, a SIP device can be a SIP host. The initial SIP message is sent via a first one of a plurality of session managers. The initial SIP message is received at the second SIP device. After receiving the initial SIP message at the second SIP device and before ending the first SIP communication session, either the first or second SIP device sends a second SIP message. The second SIP message is sent to the first one of the plurality of session managers. Either the first or second SIP device detects that an expected response SIP message to the sent second SIP message was not received within a defined time period. In response to detecting that the SIP response message was not received within the defined time period, either the first or second SIP device resends the second SIP message to a second one of the plurality of session managers.

In a different alternative, the first SIP message is sent using a first failover group domain name and the resent second SIP message also uses the first failover group domain name.

In yet a different alternative the defined time period is less than a standard defined time out value for the Session Initiation Protocol.

In another embodiment, the resent second SIP message is received at either the first or second SIP device. A first SIP communication session is established between the first SIP device and the second SIP device. The first SIP communication session is established via the second one of the plurality of session managers and the second one of the plurality of session managers is operating in a stateless mode.

In yet another alternative, the first one of the plurality of session managers was initially operating in a state-full mode.

In another embodiment, the first one of the plurality of session managers cannot respond. The first SIP communication session between the first SIP device and the second SIP device ends. A second SIP communication session is established between the first SIP device and the second SIP device via the second one of the plurality of session managers. The second one of the plurality of session managers is operating in a state-full mode for the second SIP communication session.

In an alternative, the first one of the plurality of session managers is now able to respond. After the first one of the plurality of session managers is able to respond, the first SIP device establishes a third SIP communication session between the first SIP device and the second SIP device via the first one of the plurality of session managers. The first one of the plurality of session managers is operating in a state-full mode.

In a different alternative, the first and second one of the plurality of session managers each uses a different Internet Protocol address.

In another embodiment, the first one of the plurality of session managers is designated as the preferred session manager and the second one of the plurality of session managers is designated as the secondary session manager. Together the plurality of session managers is organized into a failover group whereby each may be used as a substitute for the other in case of a failure of the other to be responsive to the SIP devices.

In yet another alternative, the plurality of session managers comprises more than two session managers and all are members of the same failover group.

In an alternative, the plurality of SIP devices are associated with a failover group and each possesses the capability of detecting the failure of a session manager in that failover group and is capable of redirecting new and existing SIP communications sessions to an alternate session manager member of the failover group.

In another alternative, the session manager members of the failover group are listed in order of preference for purposes of routing and rerouting SIP communications that originate from the plurality of SIP devices. This ordered list is assigned a failover group domain name. Each element in this ordered list contains contact information for the session manager it refers to. The ordered list defined by the failover group domain name may or may not be exhaustive of all the members of the failover group but shall always contain at least two members.

In another alternative, a plurality of failover group domain names may be defined for the failover group, each referencing a unique ordered list of session manager contact information.

In another embodiment, a failover group domain name referred to as the preferred failover group domain name, references an ordered list of session managers whereby the first one of the plurality of session managers, identified as the preferred session manager, is the most preferred server and the second one of the plurality of session managers, identified as the secondary session manager, is the alternate server. If additional session managers exist in the failover group, they may also appear in the ordered list as tertiary, quantinary choices and the like.

In another alternative, a failover group domain name referred to as the secondary failover group domain name, references an ordered list of session managers whereby the second one of the plurality of session managers, identified as the secondary session manager, is the most preferred server and the first one of the plurality of session managers, identified as the preferred session manager, is the alternate server. If additional session managers exist in the failover group, they may also appear in the ordered list as tertiary, quantinary choices and the like.

In another alternative, more than two session managers exist in the failover group and a unique failover group domain name exists for each of these additional session managers. Each failover group domain name references an ordered list wherein the additional session manager is the most preferred session manager. The failover group domain name associated with the tertiary session manager shall be referred to as the tertiary failover group domain name. The failover group domain name associated with the quantinary session manager shall be referred to as the quantinary failover group domain name, and so forth.

In another embodiment, the second session manager is configured to determine that the second SIP message was sent to the second session manager based an unavailability of the first session manager, wherein the determination is based on the primary failover group domain name appearing in the second SIP message.

In another embodiment, the first session manager is configured to determine that the second SIP message was sent to the first session manager based an unavailability of the second session manager, wherein the determination is based on the secondary failover group domain name appearing in the second SIP message.

In another embodiment, where more than two session managers comprise a failover group, the any given session manager in the failover group is configured to determine that the second SIP message was sent to another session manager in the failover group based on unavailability of the other session manager, wherein the determination is based on the failover group domain name associated with the other session manager appearing in the second SIP message.

In yet another alternative, the second session manager operates in a stateless mode based on the second SIP message containing the primary failover group domain name.

In yet another alternative, the first session manager operates in a stateless mode based on the second SIP message containing the secondary failover group domain name.

In yet another alternative, wherein more than two session managers comprise a failover group, the session manager can behave differently (e.g. operates in a stateless mode) based on the second SIP message containing the failover group domain name associated with another session manager in the failover group.

In yet another alternative, the plurality of SIP devices or a subset thereof are initialized with the primary failover group domain name to establish a preference for the preferred session manager when initiating a SIP communications session.

In yet another alternative, the plurality of SIP devices or a subset thereof are initialized with the secondary failover group domain name to establish a preference for the secondary session manager when initiating a SIP communications session.

In yet another alternative, wherein more than two session managers comprise a failover group, the plurality of SIP devices or a subset thereof are initialized with the failover group domain name of any session manager failover group member to establish a preference for that session manager when initiating a SIP communications session.

In yet another alternative, the plurality of SIP devices are capable of resolving or accessing the ordered list of session managers for all failover group domain names in the failover group regardless of which failover group domain name the SIP device would use to initiate a SIP communications session.

In another embodiment, each SIP device maintains a stateful accounting of its preferred session manager for each SIP communications session that is active. The SIP device that initiates the first SIP message may assign this session scoped session manager affinity to the session manager that is most preferred by the ordered list associated with its administered failover group domain name. The SIP device that receives the first SIP message may assign this session scoped affinity to the session manager that transmitted the first request to it. The session scoped affinity may change one or more times over the lifetime of the SIP communications session as a result of a session manager becoming non-responsive.

In another embodiment, the second SIP message is at least one of: an ACK request to a 2xx INVITE response, an ACK request for a 3xx-6xx INVITE response, an in-dialog INVITE request, an in-dialog non-INVITE request, a provisional response, a 2xx response to INVITE, a 3xx-6xx response to INVITE, a final response to an out-of-dialog non-INVITE request, a final response to an in-dialog non-INVITE request including but not limited to PRACK requests, a request or response message of any kind received from an alternate session manager in the failover group that is not the session manager that sent the previous message of any kind.

In yet another embodiment, the above methods are implemented as a system and a non-transitory computer readable medium having stored thereon instructions that cause a processor to execute a method.

BRIEF DESCRIPTION OF THE DRAWINGS

FIG. 6 is a diagram of different failover group domains.

DETAILED DESCRIPTION

Figure 1:
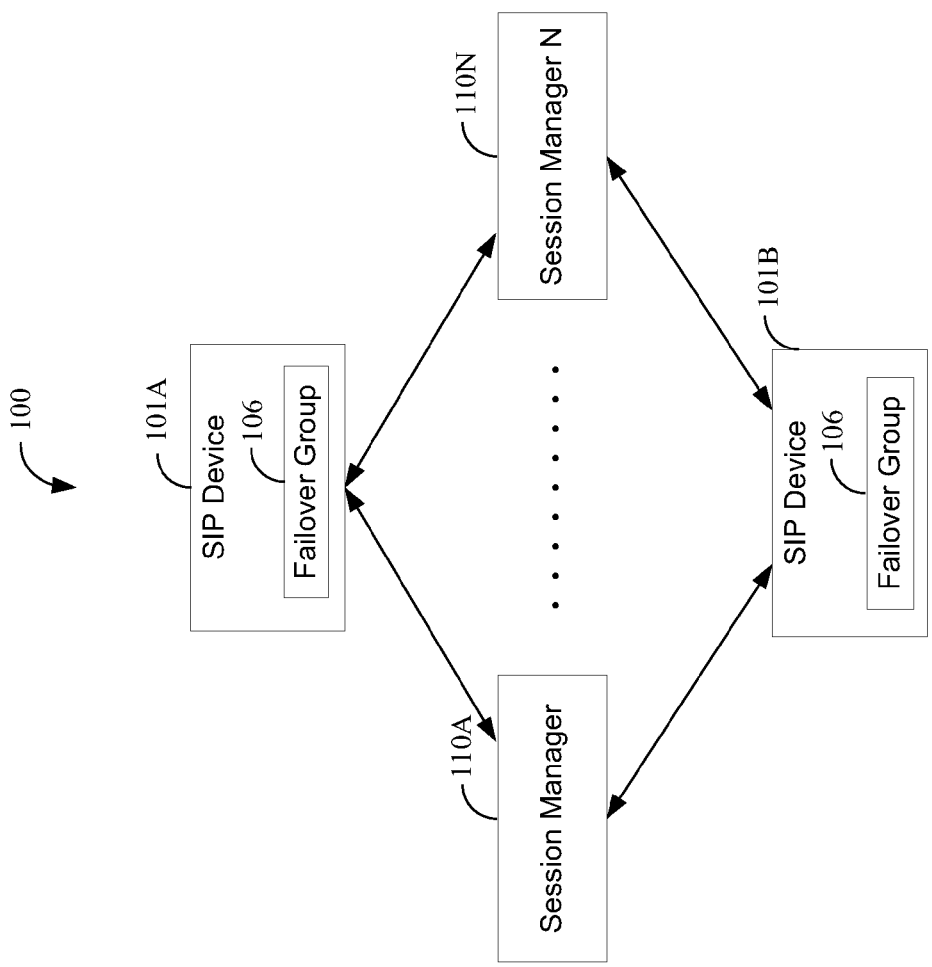
FIG. 1 is a block diagram of a first illustrative system for failing over an initiated SIP communication session.

FIG. 1 is a block diagram of a first illustrative system 100 for facilitating a SIP communication session. The systems described below can work in conjunction with existing SIP specifications, such as RFC 3261, RFC3262, and RFC 3263, which are incorporated herein by reference. The first illustrative system 100 comprises SIP device 101A, SIP device 101B, session manager 110A, and session manager 110N.

SIP device 101 may be any type of device that supports SIP. For example, SIP device 101 may be a telephone, a video phone, a Personal Computer (PC), a cellular telephone, a wired device, a tablet device, an Instant Message (IM) device, and the like.

Session manager 110 can be any hardware/software that can support routing and/or handling of SIP messages such as a router, a server, a Private Branch Exchange (PBX), a proxy server, a gateway, a network switch, a communication system, various combinations of these, and the like. Session managers 110A and 110N are each shown as a single entity. However, session managers 110A-110N may comprise a variety of components and be distributed within a network or across multiple networks. Although only two session managers 110A-110N are shown, the first illustrative system 100 may comprise any number of additional session managers 110.

A session manager 110 as used herein may include any switch or server that is capable of controlling signaling flows for one or multiple users in a communication network. It may be authoritative for certain user groups within the network or may be configured to handle communication sessions for any user in the communication network. The session manager may also be configured to help two or more communication devices exchange messages for the purposes of negotiating and establishing a media path directly between the communication devices.

Session manager 110A is designated as the preferred session manager and session manager 110N is designated as the secondary session manager. SIP device 101A sends an initial SIP message to establish a first SIP communication session from SIP device 101A to SIP device 101B. The initial SIP message may be for example, a SIP INVITE, an out-of-dialog non-INVITE SIP message, and the like. The initial SIP message is sent via session manager 110A. In this example, since the session is initiated via session manager 110A, session manager 110A operates in a state-full mode. A state-full mode is where session manager 110A can review the SIP communication session from beginning to end. SIP device 101B receives the initial SIP message that is sent via session manager 110A.

After receiving the initial SIP message at SIP device 101B and before ending the SIP communication session, SIP device 101A or SIP device 101B sends a second (e.g., a subsequent SIP message) SIP message to session manager 110A. The second message may be a response to the initial SIP message, or a later SIP message that is sent during the SIP communication session. For example, the second SIP message may be an ACK request to a 2xx (xx indicates a two digit number from 00 to 99 inclusive) response to an INVITE, an ACK request for a 3xx-6xx response to an INVITE, an in-dialog INVITE request, an in-dialog non-INVITE request, a provisional response, a 2xx response to INVITE, a 3xx-6xx response to INVITE, a final response to a out-of-dialog non-INVITE request, a final response to an in-dialog non-INVITE, a request or response message of any kind received from an alternate session manager in the failover group that is not the session manager that sent the previous message of any kind, and the like.

The SIP device 101A or 101B that sent the second SIP message detects that a response SIP message that should be sent in response to the second SIP message was not received within a predetermined time period. In response to detecting that the SIP response message was not received within the defined time period, SIP device 101A or 101B that sent the second SIP message resends the second SIP message to session manager 110N.

To further illustrate, consider the following example. SIP device 101A sends a SIP INVITE (initial SIP message) to establish a first SIP communication session to SIP device 101B. The initial SIP INVITE is sent via session manager 110A. The SIP INVITE is received by SIP device 101B. This establishes the route set for the first SIP communication session between SIP device 101A and SIP device 101B via session manager 110.

SIP device 101B sends a 180 Ringing response message to SIP device 101A via session manager 110A. In this example, session manager 110A has crashed and is not operating so the 180 Ringing message is lost. In an alternative embodiment, access to session manager 110A may be unavailable, session manager 110A may have been taken down to be serviced, session manager 110A may be unavailable due to a network failure, and the like. Under normal circumstance, the 180 Ringing message would be received at SIP device 101A (via session manager 110A). SIP device 101A would respond with a provisional SIP acknowledgement message (i.e. a PRACK).

SIP device 101B detects that the PRACK response message was not received with a defined time period (e.g., 4 seconds, which is less that the standard SIP time out). In response to detecting that the PRACK message was not received within the defined time period, SIP device 101B changes its session scoped affinity to session manager 110N and resends the 180 Ringing message to session manager 110N. Session manager 110N sends the 180 Ringing to SIP device 101A. SIP device 101A changes its session scoped affinity to session manager 110N and responds by sending a PRACK message via session manager 110N to SIP device 101B. Subsequent messages associated with this communications session are sent by SIP devices 101 via session manager 110N.

After receiving the PRACK message at SIP device 101A, a SIP Real Time Protocol (RTP) stream such as a voice communication can be established between SIP deice 101A and SIP device 101B via session manager 110N. The RTP stream can also be a secure RTP stream. Since the SIP communication session from SIP device 101A initially started on session manager 110A, only part of the SIP communication session was completed on session manager 110N. Since Session manager 110N has only seen part of the SIP communication session, session manager 110N may operate in a stateless mode for this first SIP communication session (i.e., where session manager 110N cannot reconstruct state for the full SIP communication session).

Session manager 110N can determine that the second SIP message was sent to session manager 110N based an unavailability of session manager 110A. This is based on the primary failover group domain name being present in the second SIP message's route set. When session manager 110N (the secondary session manager 110) sees the second SIP message with the primary failover group domain name, session manager 110N knows that there is a failover because the primary failover group domain name is for the preferred session manager 110A. Session manager 110N may now operate in a stateless mode on this session based the second SIP message comprising the primary failover group domain name.

Regardless whether or not the first SIP communication session has ended, a second SIP communication session can established and completed via session manager 110N; in this example, session manager 110N operates in a state-full mode on this session (session manager 110N maintains the full, current state of the SIP communication session).

If session manager 110A later becomes active and is able to respond, SIP devices 101A and 101B can become aware that session manager 110A is now active. SIP devices 101A and 101B can become aware that session manager 110 is active in various ways such as SIP devices 101A-101B sending out a polling message to session manager 110A and receiving a satisfactory response, by session manager 110A sending out a message to SIP devices 101A-101B, and the like. SIP device 101A establishes a third SIP communication session between SIP device 101A and SIP device 101B. In this example, because session manager 110A is the preferred session manager of the primary failover group domain name that was previously administered to the SIP device, the third SIP communication session is established via session manager 110A. In this instance, session manager 110A is now operating in a state-full mode.

Figure 2:
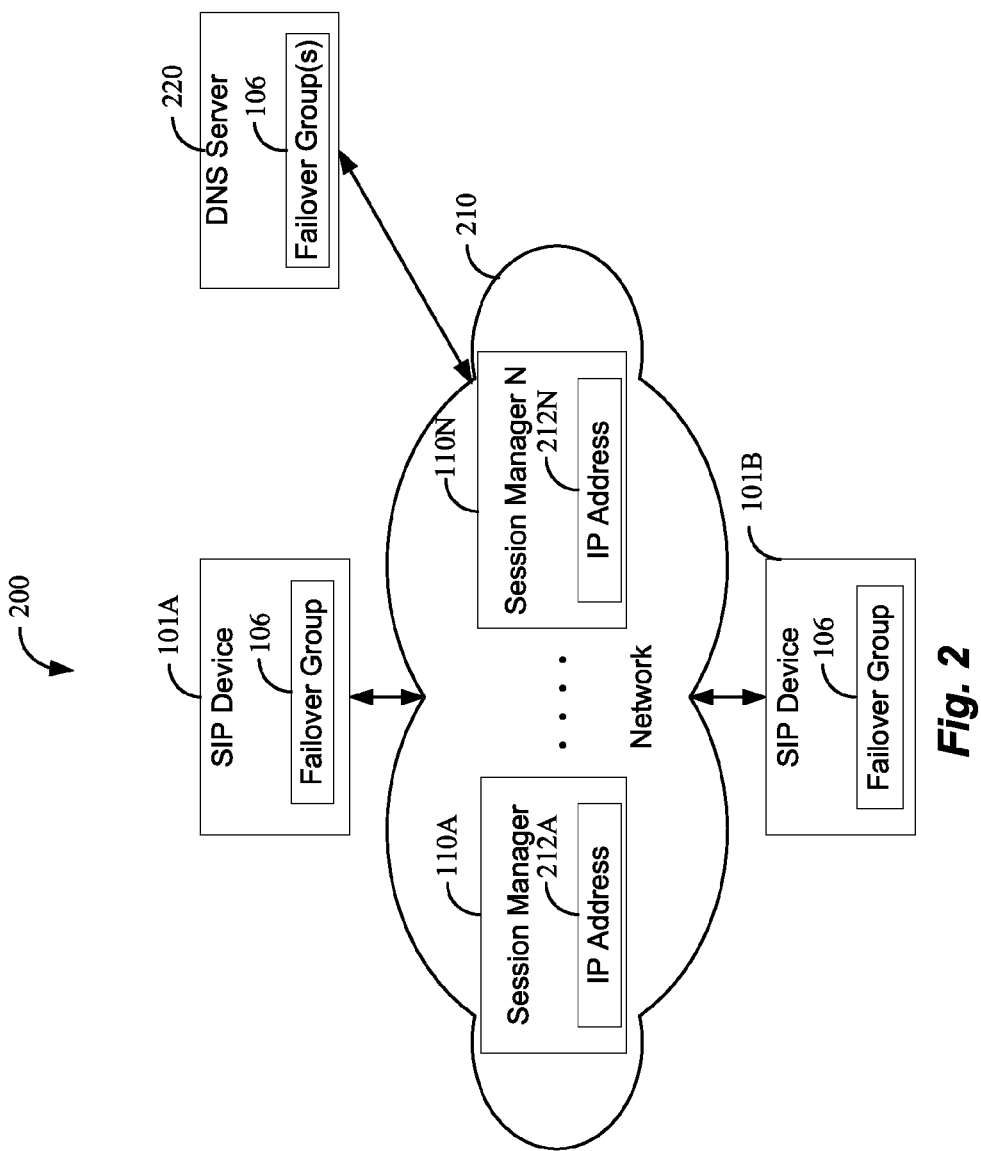
FIG. 2 is a block diagram of a second illustrative system for failing over an initiated SIP communication session.

FIG. 2 is a block diagram of a second illustrative system 200 for failing over an initiated SIP communication session. The second illustrative system 200 comprises SIP devices 101A and 101B, session managers 110A-110N, network 210, and Doman Name Server (DNS) 220.

In this illustrative example, Session Manager 110A is the preferred and session manager 110N is the alternate. Together they comprise a failover group 106. SIP devices 101A-101B have been provisioned with the primary failover group domain name for failover group 106. The primary failover group domain name is used by SIP devices 101A-101B to obtain the ordered list of contacts for session managers 110. For example, the primary failover group domain name for failover group 106 references an ordered list of session manager contacts that defines session manager 110A as the most preferred session manager and session manager 110N as the alternate session manager. In addition to the preferred session manager and the alternate session manager, additional session managers can be defined in failover group 106 and may appear on the ordered list. SIP devices 101A and 101B typically receive failover group domain name contact list resolution from the Domain Name Server 220. However, in other embodiments, SIP devices 101 may receive failover group 106 in other ways such as from a user manually provisioning the failover group's associated ordered list, the failover group domain resolution being statically programmed into SIP devices 101A and 101B, and the like.

Session managers 110A-110N further comprise Internet Protocol (IP) addresses 212A-212N. An IP address 212 is used to locate session managers on network 210.

Network 210 can be any network that can send and receive data, such as the Internet, a Wide Area Network (WAN), a Local Area Network (LAN), the Public Switched Telephone Network (PSTN), a packet switched network, a circuit switched network, a cellular network, a combination of these, and the like. Network 220 can use a variety of protocols, such as Ethernet, Internet Protocol (IP), Session Initiation Protocol (SIP), Integrated Services Digital Network (ISDN), and the like.

DNS server 220 can be any server or device that can provide domain naming services. DNS server 220 further comprises all the failover group domain name definitions for failover group 106. Failover group domain name resolutions for failover group 106 may be provided by the DNS server to SIP devices 101A-101B.

In an illustrative embodiment, SIP devices 101A-101B get failover group domain names for failover group 106 from DNS server 220. In this example, session manager 110A is provisioned with failover group 106's primary and secondary failover group domain names.

In this example, IP address 212A is a different IP address than IP address 212N. IP address 212A would actually consist of a full contact specification in practice (i.e. IP address, contact port and transport type) but is simplified for purposes of this example. Each session manager can be identified on network 210 with a unique contact specification.

SIP device 101A sends an initial SIP message to establish a first SIP communication session from SIP device 101A to SIP device 101B. The initial first SIP message is sent via session manager 110A as directed by the resolved ordered contact list derived from the primary failover group domain name. SIP device 101B receives the initial SIP message that is sent via session manager 110A.

After receiving the initial SIP message at SIP device 101B and before ending the SIP communication session, SIP device 101A and/or SIP device 101B sends a second SIP message to session manager 110A. The second SIP message is sent using the primary failover group domain name. The SIP device 101A or 101B that sent the second SIP message detects that a response SIP message that should have been received by it in response to the second SIP message was not received within a predetermined time period. In response to detecting that the SIP response message was not received within the defined time period, SIP device 101A or 101B that sent the second SIP message resends the second SIP message via session manager 110N. The resent second SIP message also uses the first failover group domain name. This way session manager 110N knows that there was a failover condition in session manager 110A. The primary failover group domain name is used for the duration of the SIP communication session even though the SIP devices have changed their session scoped affinity to use session manager 110N (the alternate session manager on the ordered list).

To further illustrate, consider the following example. SIP device 101A sends a SIP INVITE via session manager 110A to establish a first SIP communication session to SIP device 101B. The initial SIP INVITE contains the primary failover group domain name. This establishes the route set for the first SIP communication session between SIP device 101A and SIP device 101B via session manager 110 in accordance with the SIP standard.

SIP device 101B sends a 200 OK response message to SIP device 101A via session manager 110A. The 200 OK response message contains the primary failover group domain name. In this example, session manager 110A has crashed and is not operating so the 200 OK message is lost. Under normal circumstance, the 200 OK message would be received at SIP device 101A (via session manager 110A). SIP device 101A would respond with SIP ACK message.

SIP device 101B detects that the ACK response message was not received with a defined time period (e.g., 4 seconds, which is less that the standard SIP time out). In response to detecting that the response ACK message was not received within the defined time period, SIP device 101B resends the 200 OK message to session manager 110N. The 200 OK message contains the primary failover group domain name. Session manager 110N sends the 200 OK message to SIP device 101A. SIP device 101A responds by sending the SIP ACK message via session manager 110N to SIP device 101B using the primary failover group domain name. The primary failover group domain name is used for the remainder of the SIP communication session.

At this point, if either the SIP device 101A or 101B initiates a second SIP communication session by sending a SIP INVITE, the process can work in different ways. For example, if SIP device 101B does not know that session manager 110A is unavailable, SIP device 101B can send a SIP INVITE to session manager 110A (the preferred session manager 110). Upon detecting that session manager 110A is not responding, SIP device 101B sends the SIP INVITE using the primary failover group domain name to session manager 110N. Upon detecting a response from session manager 110N, SIP device 101B now uses the secondary failover group name for the SIP communication session. Both SIP devices 101 will set session scoped affinity to session manager 110N.

Alternatively, if SIP device 101B already knows that session manager 110A is not available, SIP device 101B can send the first SIP INVITE message using the alternate contact information in the primary failover group domain name's ordered list causing it to contact session manager 110N. Upon receiving a response from session manager 110N, containing Record-Route headers with the secondary failover group name SIP device 101B now sets its session scoped affinity to the secondary session manager for the SIP communication session.

Figure 3:
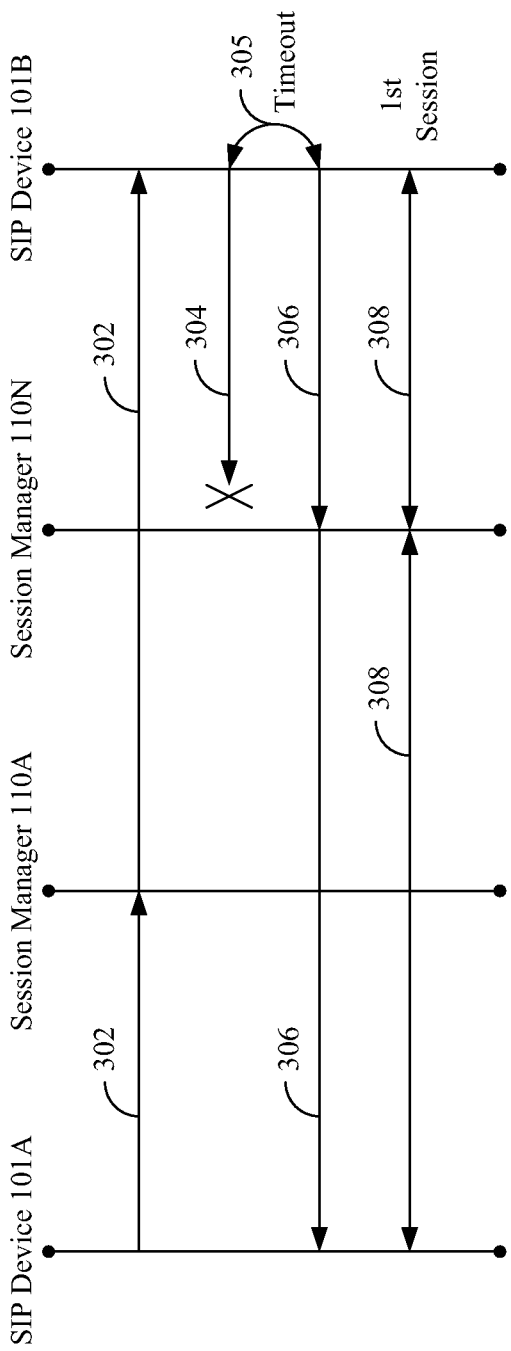
FIG. 3 is a flow diagram of a method for failing over an initiated SIP communication session.

FIG. 3 is a flow diagram of a method for failing over an established SIP communication session. Illustratively, SIP device 101, session manager 110, and DNS server 220 are stored-program-controlled entities, such as a computer or processor, which performs the method of FIGS. 3-6 and the processes described herein by executing program instructions stored in a non-transient computer readable storage medium, such as a memory or disk.

SIP device 101A sends an initial SIP INVITE message 302 to establish a first SIP communication session from SIP device 101A to SIP device 101B. The initial first SIP message 302 is sent using the ordered contact list obtained by resolving the primary failover group domain name. The initial SIP message is sent via session manager 110A. SIP device 101B receives the initial SIP message that is sent via session manager 110A.

After receiving the initial SIP message at SIP device 101B and before ending the SIP communication session, SIP device 101B sends a second SIP message 304 to session manager 110A. Note that the second SIP message does not have to be a response to the initial SIP message. The second SIP message is sent using the primary failover group domain name. SIP device 101B detects 305 that a response SIP message that should be sent by SIP device 101A in response to the second SIP message was not received within a predetermined time period. In response to detecting that the SIP response message was not received within the defined time period, SIP device 101B resends 306 the second SIP message to SIP device 101A via session manager 110N. The resent second SIP message also uses the first failover group domain name. The resent second SIP message is received by SIP device 101A. A SIP communication session (e.g., a SIP session that contains an RTP session) is established 308 between SIP device 101A and SIP device 101B via session manager 110N. The primary failover group domain name is used for the duration of the SIP communication session (even though the remainder of the SIP communication session is on session manager 110N).

Figure 4:
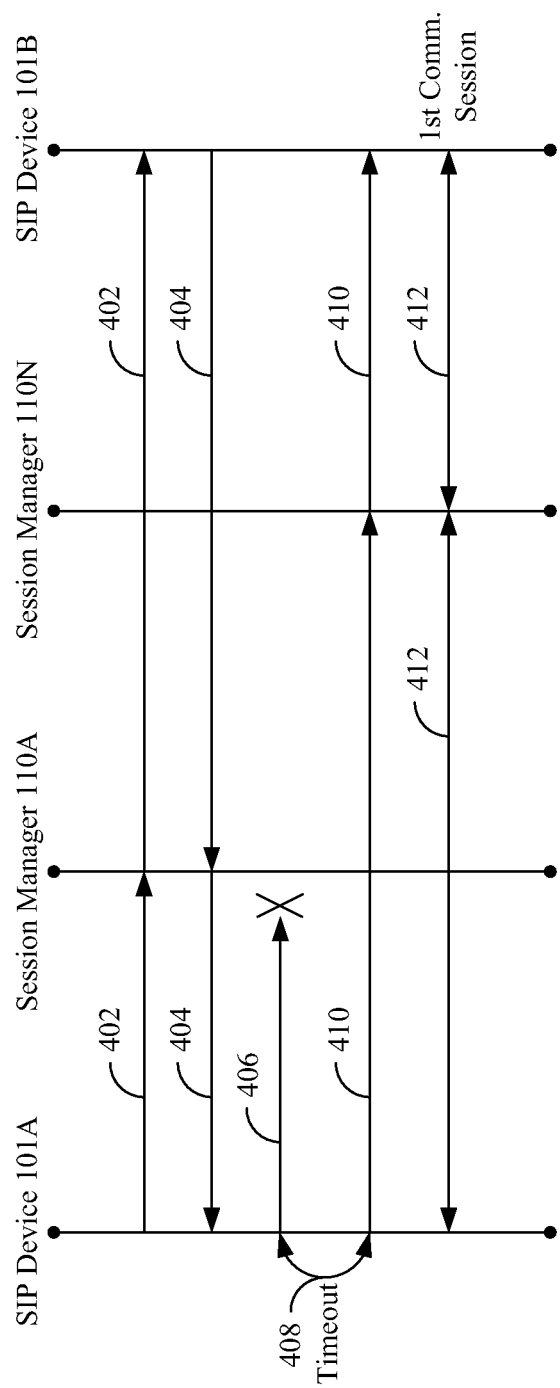
FIG. 4 is a flow diagram of a method for failing over an initiated SIP communication session.

FIG. 4 is a flow diagram of a method for failing over an established SIP communication session. SIP device 101A sends an initial SIP message 402 to establish a first SIP communication session from SIP device 101A to SIP device 101B. The initial first SIP message 402 is sent via session manager 110A using the ordered session manager contact list obtained when resolving the primary failover group domain name. SIP device 101B receives the initial SIP message that is sent via session manager 110A. SIP device 101B sends a response message 404 to SIP device 101A via session manager 110A. The response message contains Record-Route headers with the primary failover group domain name.

After receiving the response message from SIP device 101B, SIP device 101A sends a second SIP message 406 to SIP device 101B via session manager 110A. The second SIP message is sent using the primary failover group domain name. SIP device 101A detects 408 that a response SIP message that should be sent by SIP device 101B in response to the second SIP message was not received within a predetermined time period. In response to detecting that the SIP response message was not received within the defined time period, SIP device 101A resends the second SIP message 410 to session manager 110N which statelessly forwards it. The resent second SIP message also uses the first failover group domain name. The resent second SIP message is received by SIP device 101B. A session (e.g., an RTP session) is established 412 between SIP device 101A and SIP device 101B via session manager 110N. The primary failover group domain name is in the session's route set for the duration of the SIP communication session even though the remainder of the SIP communication session is on session manager 110N.

Figure 5:
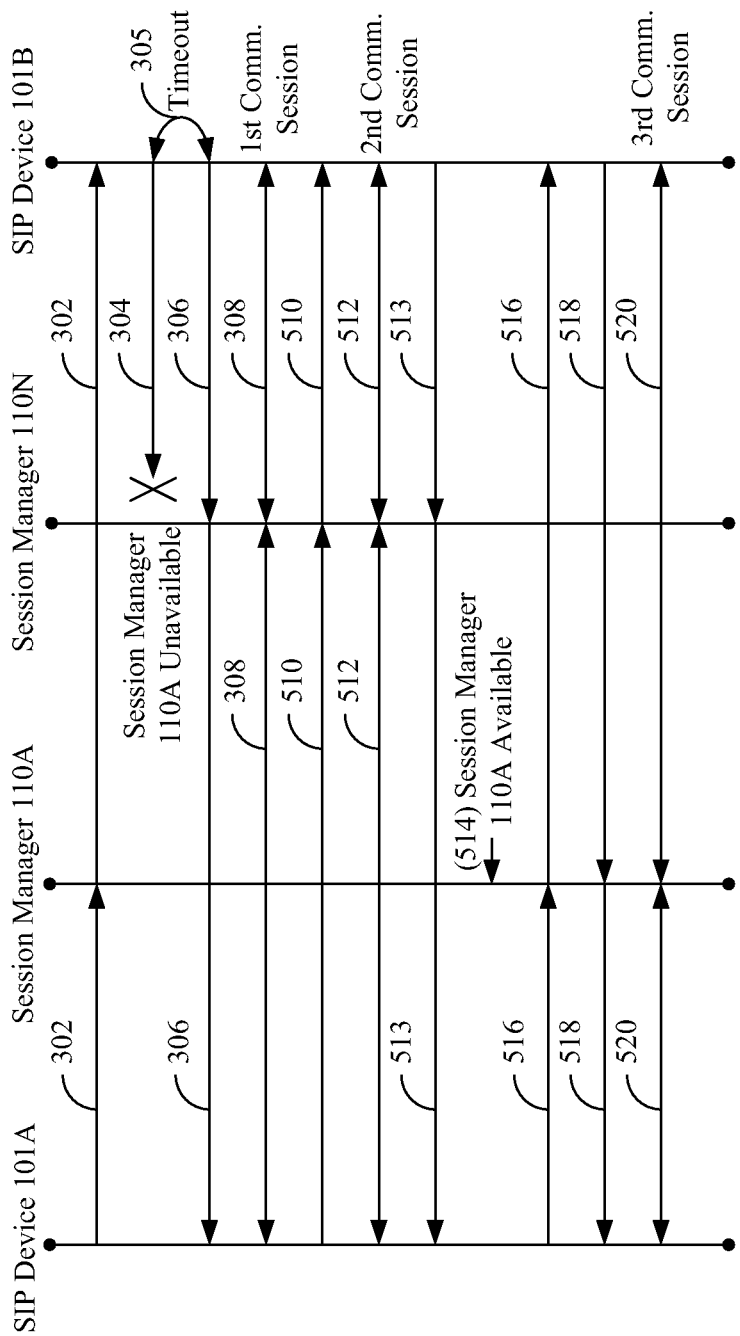
FIG. 5 is a flow diagram of a method for switching from a failed over session manager.

FIG. 5 is a flow diagram of a method for switching from a failed over session manager. The flow diagram of FIG. 5 begins with the steps 302-308 of FIG. 3 where a $1^{st}$ SIP communication session is established in step 308. The timeout in step 305 occurred because session manager 110A became unavailable and could not respond. The first communication session is ended 510. For example, SIP device 101A sends 510 a SIP BYE message (based on a user of SIP device 101A hanging up) to SIP device 101B via session manager 110N.

Because session manager 110A is still unavailable, a second SIP communication session is established 512 via session manager 110N between SIP device 101A and SIP device 101B. This is because SIP devices 101A and 101B assign initial session scoped affinity to session manager 110N (because session manager 110A is unavailable). Session manager 110N is operating in a state-full mode. The second SIP communication session is established using the secondary failover group domain name. The second SIP communication session is ended 513. For example, by SIP device 101B sending a SIP BYE message 513 (the BYE response is omitted for clarity). For the second SIP communication session, session manager 110N is operating in a state-full mode.

At this point, session manager 110 is now available and able to respond 514. SIP device 101A initiates 516 a third SIP communication session via session manager 110 using the primary failover group domain (SIP device 101A observes that session manager 110A is now available). The primary failover group domain name is used in the route set because session manager 110A is the preferred session manager. SIP device 101B responds 518 to the initial INVITE message. A third SIP communication session is established 520 via session manager 110. Session manager 110A is operating in a state-full mode. The primary failover group domain name is used in the route set for the duration of the third SIP communication session.

FIG. 6 is a diagram of different failover group domain name resolutions. A failover group 106 comprises a preferred session manager 110 and one or more alternate session managers 110. FIG. 6 shows three exemplary failover groups (106A, 106B and 106C). Failover group 106A comprises a preferred session manager (SM1) and two alternate session managers (SM2 and SM3). The preferred session manager 100 for failover group domain name 106A is SM1. The first alternate session manager 110 is SM2. The second alternate session manager 110 is SM3.

Failover group 106B, like failover group 106A comprises a preferred session manager 110 and two alternate session managers 110. However, in the resolution for failover group domain name 106B, the preferred session manager 110 for failover group domain name 106A is designated as SM2. The first alternate session manager 110 is SM1. The second alternate session manager 110 SM3. Note that an alternate session manager in one resolution (SM1 in failover group domain name 106B) can be a preferred session manager in another resolution (SM1 in failover group domain name 106A). Likewise, a preferred session manager 110 (SM1 in failover group 106A) can be an alternate session manager (SM1 in failover group 106C).

In failover group domain 106C, the preferred session manager 110 is session manager 3. The alternates are session mangers 1 and session manager 3.

A session manager 110 can only be preferred in a single failover group domain name resolution 106 within a given failover group. However, a session manager can be a alternate session manager in multiple failover group domain name resolutions 106.

Although each of the three session managers 110 are shown as primaries in a failover domain group 106, in alternative embodiments, a session manager 110 in a failover group may not be a preferred session manager in a failover group 106. For example, failover group 106C may not exist. In this scenario, session manager 3 would be an alternative session manager 110 (in failover groups 106A and 106B), but not a primary session manager 110.

Figure 7:
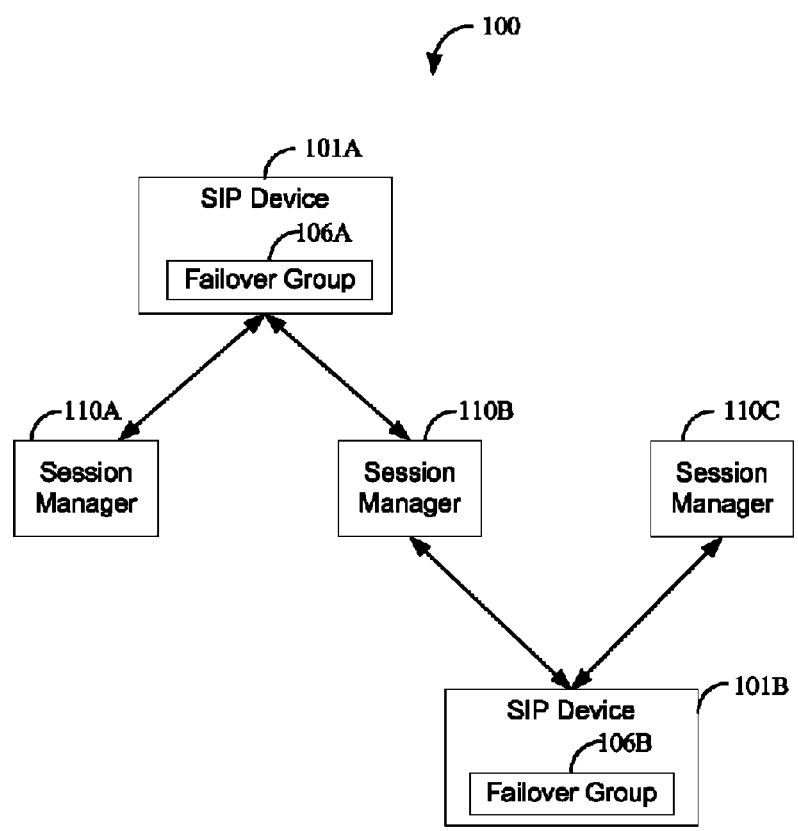
FIG. 7 is a first diagram for two tier routing.

FIG. 7 is a first diagram for two tier routing. In this embodiment, failover group 106A contains session manager 110B as the preferred session manager and session manager 110A as a alternate session manager. Failover group 106B contains session manager 110B as the preferred session manager and session manager 110C as the alternate session manager. SIP device 101A is associated with failover group 106A and SIP device 101B is associated with failover group 106B. SIP device 101A uses the primary failover group domain name resolution to contact session managers in failover group 106A meaning it prefers session manager 110B with 110A as the alternate. SIP Device 101B uses the primary failover group domain name resolution to contact failover group 106B meaning it prefers session manager 110B with 110C as the alternate.

When session manager 110B fails, communication device 101A fails over to session manager 110A and communication device 101B fails over to session manager 110C. In this example, there is no direct connectivity between session manager 110A/SIP device 101A and session manger 110C/SIP device 101B, unless the original request is treated as a route-through scenario (Two-Tier routing). Otherwise, responses and mid-dialog requests cannot be routed correctly. With Two-Tier routing, session manager 110B can create another hop (a route-through step) during the initial request processing. Under normal conditions, the requests and responses follow the path: SIP device 101A⇔ session manager 110B ⇔ session manager 110B⇔ SIP device 101B. If session manager 110B fails after the initial request processing, the response/mid-dialog requests are re-routed to take the following path: SIP device 101A⇔ session manager 110A⇔ session manager 110C⇔ SIP device 101B. Notice that session manager 110B appears twice under normal conditions. This is because the route set must contain the primary failover group domain names for both failover groups and they both prefer session manager 110B. When 110B fails, the alternate session manager contacts (110A and 110C) will be used without altering the immutable route set.

Figure 8:
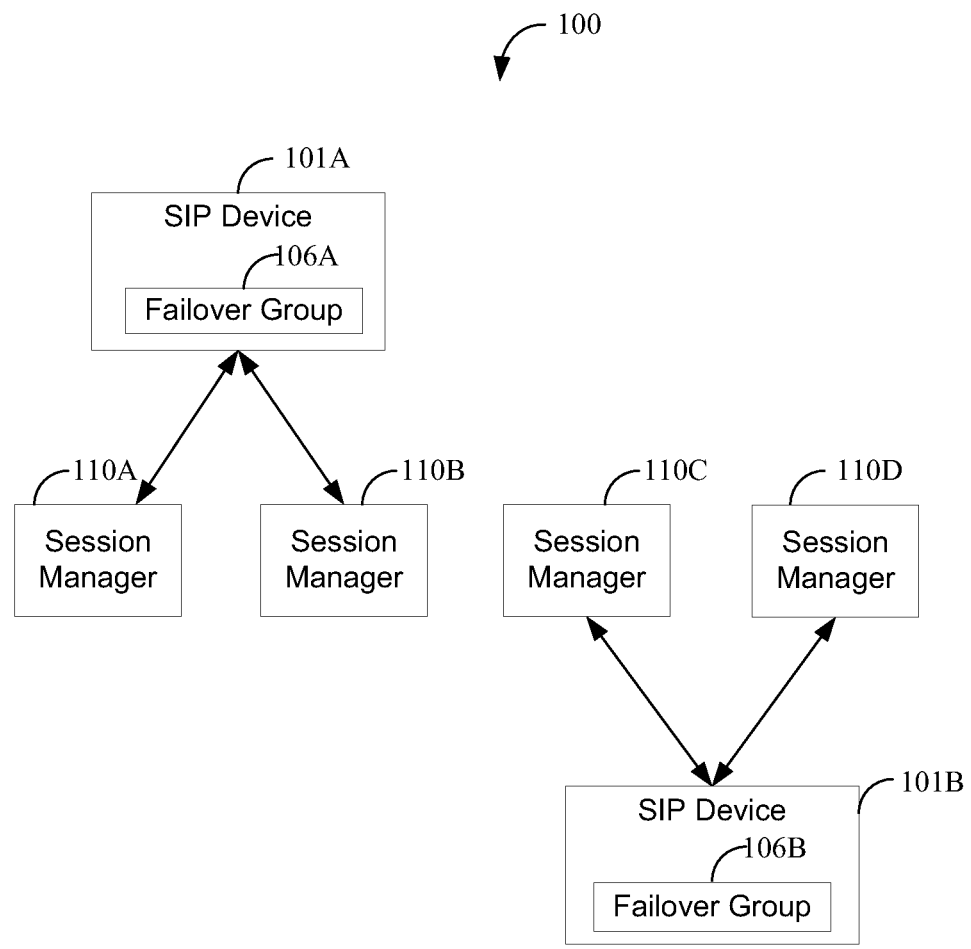
FIG. 8 is a second diagram for two tier routing.

FIG. 8 is a second diagram for two tier routing. In this embodiment, SIP device 101A is associated with failover group 106A which contains session managers 110A and 110B. SIP device 101B is associated with failover group 106B which consists of session managers 110C and 110D. Failover groups 106A and 106B are disjoint in that they do not share a common session manager. SIP device 101A uses the primary failover group domain name resolution to contact session managers in failover group 106A meaning it prefers session manager 110A with 110B as the alternate. SIP Device 101B uses the primary failover group domain name resolution to contact failover group 106B meaning it prefers session manager 110C with 110D as the alternate.

Under normal conditions, the requests and response take the following path: SIP device 101A⇔ session manager 110A⇔ session manager 110C⇔ SIP device 101B. If session manager 101A fails after the initial request processing, the response/mid-dialog requests take the following path: SIP device 101A⇔ session manager 110B⇔ session manager 110C⇔ SIP device 101B. If session manager 110C fails after the initial request processing, the response/mid-dialog requests take the following path: communication device 101A⇔ session manager 110A⇔ session manager 110D ⇔ SIP device 101B.

Of course, various changes and modifications to the illustrative embodiment described above will be apparent to those skilled in the art. These changes and modifications can be made without departing from the spirit and the scope of the system and method and without diminishing its attendant advantages. The following claims specify the scope of the invention. Those skilled in the art will appreciate that the features described above can be combined in various ways to form multiple variations of the invention. As a result, the invention is not limited to the specific embodiments described above, but only by the following claims and their equivalents.

What is claimed is:

1. A method comprising:
   sending, from a first SIP device to a second SIP device, an initial Session Initiation Protocol (SIP) message to establish a first SIP communication session, wherein the initial SIP message is sent via a first one of a plurality of session managers;
   receiving the initial SIP message at second SIP device;
   after receiving the initial SIP message at the second SIP device and before ending the first SIP communication session, either the first or second SIP device sending a second SIP message, wherein the second SIP message is sent to the first one of the plurality of session managers;
   after the initial SIP message is received at the second SIP device, detecting in either the first or second SIP devices that a response SIP message to the sent second SIP message was not received within a defined time period; and
   in response to detecting that the SIP response message was not received within the defined time period, either the first or second SIP device resending the second SIP message to a second one of the plurality of session managers.

2. The method of claim 1, wherein the first SIP message comprises a first failover group domain name and wherein the resent second SIP message also comprises the first failover group domain name.

3. The method of claim 1, wherein the defined time period is less than a standard defined time out value for the Session Initiation Protocol.

4. The method of claim 1, further comprising:
   receiving the resent second SIP message at either the first or second SIP device; and
   establishing the first SIP communication session between the first SIP device and the second SIP device, wherein the first SIP communication session is established via the second one of the plurality of session managers and the second one of the plurality of session managers is operating in a stateless mode.

5. The method of claim 4, wherein the first one of the plurality of session managers was initially operating in a state-full mode.

6. The method of claim 5, wherein the first one of the plurality of session managers cannot respond and further comprising the steps of:
   ending the first SIP communication session between the first SIP device and the second SIP device; and establishing a second SIP communication session via the second one of the plurality of session managers between the first SIP device and the second SIP device, wherein the second one of the plurality of session managers is operating in a state-full mode for the second SIP communication session.

7. The method of claim 6, wherein the first one of the plurality of session managers is now able to respond and further comprising the steps of:
after the first one of the plurality of session managers is able to respond, the first SIP device establishing a third SIP communication session between the first SIP device and the second SIP device via the first one of the plurality of session managers, wherein the first one of the plurality of session managers is operating in a state-full mode.

8. The method of claim 1, wherein the plurality of session managers comprises more than two session managers.

9. The method of claim 1, wherein the first and second one of the plurality of session managers each use a different Internet Protocol address.

10. The method of claim 1, wherein the first and second SIP devices receive a message identifying a first failover group that identifies the plurality of session managers, the first one of the plurality of session managers is primary session manager and the second one of the plurality of session managers is a secondary session manager.

11. The method of claim 10, wherein the second one of the plurality of session managers is defined in second failover group as a primary session manager or the first one of the plurality of session managers is defined in the second failover group as a secondary session manager.

12. The method of claim 1, wherein the first SIP device has a first failover group that defines the first one of the plurality of session managers as a primary session manager for the first failover group and the second one of the plurality of session managers as a secondary session manager for the first failover group, wherein the second SIP device has a second failover group that defines the first one of the plurality of session managers as the primary session manager for the second failover group and a third one of the plurality of session managers as a secondary session manager for the second failover group, wherein the first one of the plurality of session managers fails and in response to the first session manager failing, any subsequent messages are routed between the second session manager and the third session manager.

13. The method of claim 1, wherein the first SIP device has a first failover group that defines the first one of the plurality of session managers as a primary session manager for the first failover group and the second one of the plurality of session managers as a secondary session manager for the first failover group, wherein the second SIP device has a second failover group that defines a third one of the plurality of session managers as the primary session manager for the second failover group and a fourth one of the plurality of session managers as a secondary session manager for the second failover group, wherein the first one of the plurality of session managers or the third one of the session managers fail and in response to the first session manager failing, any subsequent messages are routed between the second session manager and the third session manager and in response to the third session manager failing, any subsequent messages are routed between the first session manager and the fourth session manager.

14. A system comprising:
a first SIP device configured to send an initial Session Initiation Protocol (SIP) message to establish a first SIP communication session from a first SIP device to a second SIP device, wherein the initial SIP message is sent via a first one of a plurality of session managers,
a second SIP device configured to receive the initial SIP message; and
both the first and second SIP devices configured to, after receiving the initial SIP message at the second SIP device and before ending the first SIP communication session, send a second SIP message, wherein the second SIP message is sent to the first one of the plurality of session managers;
after the initial SIP message is received at the second SIP device, detect that a response SIP message to the sent second SIP message was not received within a defined time period; and
in response to detecting that the SIP response message was not received within the defined time period, resend the second SIP message to a second one of the plurality of session managers.

15. The system of claim 14, wherein the first SIP message comprises a primary failover group domain name and wherein the resent second SIP message also comprises the primary failover group domain name and the first and second one of the plurality of session managers each use a different Internet Protocol address.

16. The system of claim 15, further comprising the first session manager and the second session manager and wherein the second session manager is configured to determine that the second SIP message was sent to the second session manager based an unavailability of the first session manager, wherein the determination is based on the primary failover group domain name in the second SIP message.

17. The system of claim 16, wherein the second session manager operates in a stateless mode based the second SIP message comprising the primary failover group domain name.

18. The system of claim 14, wherein the second SIP message is at least one of: an ACK request to a 2xx INVITE response, an ACK request for a 3xx-6xx INVITE response, an in-dialog INVITE request, an in-dialog non-INVITE request, a provisional response, a 2xx response to INVITE, a 3xx-6xx response to INVITE, a final response to an out-of-dialog non-INVITE request, a final response to an in-dialog non-INVITE request, a P RACK request, and a request or response message of any kind received from an alternate session manager in the failover group that is not the session manager that sent the previous message.

19. The system of claim 14, wherein the first SIP device and the second SIP device are further configured to:
receive the resent second SIP message; and
establish the first SIP communication session between the first SIP device and the second SIP device, wherein the first SIP communication session is established via the second one of the plurality of session managers and the second one of the plurality of session managers is operating in a stateless mode.

20. The system of claim 19, wherein the first one of the plurality of session managers was initially operating in a state-full mode and the first SIP device and the second SIP device are further configured to end the first SIP communication session between the first SIP device and the second SIP device and establish a second SIP communication session via the second one of the plurality of session managers between the first SIP device and the second SIP device, wherein the second one of the plurality of session managers is operating in a state-full mode for the second SIP communication session.

* * * * *